Patented Apr. 11, 1950

2,503,313

UNITED STATES PATENT OFFICE 2,503,313

PRODUCTION OF DRIED, DEFATTED ENZYMATIC MATERIAL

Ezra Levin, Champaign, Ill.

No Drawing. Application April 14, 1947,
Serial No. 741,418

17 Claims. (Cl. 195—65)

This invention relates to a method for producing from glandular materials and other tissues, defatted and dehydrated powders of high enzymatic activity, useful per se, or as a source of individual enzymes. More particularly, it relates to a process for recovering enzymes and activating the inactive form of enzymes in glandular tissue.

Formerly, fresh glandular substances from cattle, sheep, hogs, horses, etc., were macerated and then extracted with water solutions, dilute alcohol, dilute glycerol, or the like, to obtain a crude extract of enzymes. These crude extracts were dried or further purified by various methods described in the literature. The process must usually be carried out at low temperatures, approximately 0° C. to inhibit enzymatic activity during preparation. Pancreatin powder, for example, is conventionally prepared by mincing pancreas with water, pressing the mixture to recover a liquid extract, and adding absolute alcohol to precipitate the active enzymatic substance. The precipitate is filtered, dried and sold as pancreatin USP and contains trypsin, amylase and sometimes lipase. By United States Pharmacopoeia (USP) standards pancreatin must be able to render twenty-five times its weight of casein non-precipitatable by acid-alcohol after incubation for one hour at 40°. It must contain amylase enough to hydrolyze twenty-five times its weight of potato starch past the erythrodextrin stage in five minutes at 40°. USP standards do not require lipase activity, this being the most readily destroyed of the pancreatic enzymes, but British Pharmacopoeia (BP) standards require lipase activity whereby 10 mg. of pancreatin in 10 cc. of cream suspension incubated for four hours at 40° C. will produce acid equivalent to 1.0 cc. of 0.05 N sodium hydroxide.

The pancreatic substance made by the conventional methods is an extract of the enzymes from the pancreas. Many of the enzymes remain in the residue. According to the method of this invention the enzymes remain in the pancreas, not only the trypsin, amylase and lipase, but other biologically significant enzymes such as carboxypeptidase, ribonuclease, desoxyribonuclease, guanase, guanosinease, cholesterol esterase, lecithinase and others. Instead of the enzymes being extracted from the pancreas, by the method of this invention only the water and fat are removed without substantially impairing the activity of the enzymes.

Certain inactive forms of enzymes may be activated by various known methods. For example, trypsinogen in the minced gland is converted to trypsin upon digestion for periods of time ranging from several hours to several days at a temperature of about 15 to 45° C. By the present invention, trypsinogen is converted to trypsin and chymotrypsinogen to chymotrypsin by pre-activation to a maximum and is then dried and defatted simultaneously as hereinafter described, while this high enzymatic activity is held substantially without change, to produce highly active raw powders equal in activity to the fresh gland.

Commercial pancreas powder as it has been available contains less than one-fourth of the trypsin and one-tenth the amylase of the pancreas powder produced by the method of this invention. Commercial pancreatin varies in potency, as was found by Beazell et al., Jl. Amer. Medical Assn., 116, 27–35 (1941) who states, "Of 8 products bought at local stores and tested, 2 were essentially inactive and 2 possessed little more than half the activity of the preparation used." The present invention not only produces powders of potency around five or six times that required by USP standards, but the potency, because of the method in which it is produced, is more uniform both at the time produced and upon standing.

Pancreas treated according to the method of this invention and without further concentration has from three to six times the trypsin activity required of USP pancreatin; three to five times the amylase strength required of USP pancreatin; and from forty to sixty times the lipase activity required by British Pharmacopoeia standards. Other glandular substances and tissues such as liver, thyroid, stomach lining, intestinal mucosa, whole duodenum, kidney, kidney cortex, kidney medulla, spleen, whole blood, hemoglobin, blood plasma or serum, brain, heart, ovary, testes, lymph glands, mammary glands, thymus, pituitary gland, or the anterior and posterior parts separately, placenta, prostate, bladder, spinal cord, muscle, bone marrow, whole adrenals, adrenal cortex, adrenal medulla, salivary glands, corpus luteum, uterus, pineal, bile, parathyroid, intestines, fish entrails and glands including the pyloric caeca, etc., when treated according to the present invention, produce powders of enzymatic values substantially equal to the raw product.

In a broad embodiment the invention comprises simultaneously dehydrating and defatting enzymatic material by conducting an azeotropic distillation in the presence of a water insoluble organic compound, at a temperature below that at which enzymes are destroyed by heat.

In another embodiment the invention comprises autolyzing enzymatic material to increase the content of active enzymes and thereafter subjecting the autolyzed material to an azeotropic distillation in the presence of an organic solvent at a temperature below that at which enzymes are destroyed, said distillation being conducted under conditions such that no substantial undesirable change in the desired enzymatic activity occurs while continued autolysis is held to a minimum.

In one specific embodiment the present invention comprises simultaneously defatting and dehydrating an enzyme-containing substance at a temperature below 60° C. in the presence of a water immiscible fat solvent preferably having a specific gravity greater than 1.0, said solvent being capable of forming an azeotrope boiling below either pure water or the pure solvent, the temperature of the operation being regulated by the pressure at which the treatment is caused to take place.

According to a specific embodiment, the invention comprises mixing an enzyme-containing glandular substance with a fat solvent capable of forming an azeotrope with water, conducting a distillation to remove the azeotrope therefrom at a temperature below about 60° C., said temperature being attained by regulation of the pressure on the system, continuing the distillation until the water is removed substantially completely but without allowing the temperature to exceed 60° C., separating the liquid solvent containing fat in solution, rinsing the dry residue with fresh solvent, and finally removing solvent from the dry residue at a temperature below 60° C. to about 70° C. preferably by vacuum distillation.

Certain enzymes exist in their particular tissues in an inactive form, such as trypsinogen and chymotrypsinogen in the pancreas, pepsinogen in the stomach, etc. For example, if the pancreas is removed shortly after an animal is killed and the trypsin content measured, very little evidence of trypsin activity will be found. If a trypsin activator is added to this fresh material, however, the trypsin activity may be increased as much as twenty times the original measurement. A similar result may be obtained by allowing the tissue to autolyze under the proper conditions. If improperly treated, however, the inactive form of the enzymes may become irreversibly inactivated by conversion into inactive protein or by protein degradation. According to the present method of treatment, such enzyme-containing tissues are allowed to become activated, preferably to develop maximum activity. The manner and methods of doing this are known and may vary depending upon the type of enzyme which it is desired to recover, and upon the type of tissue which is being treated. The art involves (1) choosing the optimum conditions for maximum activation of the enzyme desired, (2) minimizing deterioration or degradation of other valuable substances, and (3) in being able to stop the reactions when desired.

It is a feature of this invention that as soon as the maximum enzyme activity has been reached, that the material is distilled in the presence of a fat solvent of a character described hereinafter and under the conditions described, to inhibit all reactions and to produce the dried powder having maximum enzymatic activity. Throughout the discussions in this application, reference to enzymes, unless otherwise noted, means the active form of the enzymes.

In one variation of the invention the activated material is mixed with a chlorinated solvent such as ethylene dichloride, etc., as hereinafter described. This stops any further enzymatic activity and prevents any loss of activity for a period of time. Certain other solvents cannot be used in this way since they do not stop the action and, as a consequence, there may be an actual loss of activity of the final powder unless the distillation is carried out at once. These include aromatic hydrocarbons such as toluene. However, in view of the fact that the drying and defatting step can be carried out in a comparatively short period of time, and also in view of the fact that the continued action of the enzymes or other components in the tissue depends upon the presence of water, which by the present process is rapidly removed, the solvents of this character can be used but are not necessarily exactly equivalent to the halogenated solvents.

Certain tissues should be treated immediately after the animal is killed, or should be deep frozen as quickly as possible in order to prevent loss of activity. Among these are the enzymes produced from certain fish, including the pyloric caeca, stomach and intestines.

The enzymes are sensitive to heat and it has been found that they are generally destroyed at temperatures above 60° C. if the temperature is held at this point for any substantial period of time. When treating pancreas, for example, according to the present invention, it has been found that the dried, defatted substance remaining after treatment at 70° had no activity for trypsin, lipase or amylase. When treated below 60° the material had enzymatic activity, although if 60° is exceeded the enzymatic activity is rapidly lost. For practical purposes approximately 50-55° C. should not be exceeded, and it is preferred that the operation be carried out at about 45° C. The optimum temperature for any particular substance varies somewhat depending upon the substance. Certain materials can be treated at slightly higher temperatures than others without destroying the enzyme activity. In general, conditions are used such that the treatment takes place in a temperature range of about 30° to 45° C., and preferably not exceeding 50° C.

Some substances can be treated at atmospheric pressure depending upon the solvent that is used, but there is always a question of balancing enzyme activity of the finished product against operating cost. The exact pressure used for any particular temperature will depend upon the solvent employed and the pressure-temperature boiling curve of the azeotrope formed. Because the system from beginning to the final dry end product involves a mixture of vapors of water and solvent, and proceeds at low temperatures, oxidation is greatly reduced. Thus ascorbic acid, which is sensitive to oxidation and which is naturally found in animal tissues, remains in the final product in the reduced (physiologically active) state.

The defatting-dehydration step is carried out in the substantial absence of atmospheric oxygen.

It is preferred to use halogenated solvents and particularly the halogenated derivatives of low boiling aliphatic hydrocarbons. These may include chlorine, bromine and in certain instances, fluorine derivatives. These halogenated solvents should boil below approximately 120° C. under standard conditions and should be capable of forming an azeotrope with water boiling substantially below 100° C. at atmospheric pressure. They should be capable of forming an azeotrope which will remove water from a system containing it at a temperature below 60° C. in sufficient proportions that large quantities of solvent are not necessary. Thus, if too much solvent must be used, the cost of heating and revaporizing the solvent becomes prohibitive and the process loses its commercial practicability.

The preferred solvents are ethylene dichloride, propylene dichloride, trichlorethylene and perchlorethylene. These solvents not only have the required characteristics of boiling point but they also produce azeotropes which will remove substantial quantities of water per unit weight of solvent distilled so that dehydration can be carried out at a reasonable cost particularly under reduced operating pressures. Furthermore, these solvents, particularly ethylene dichloride or propylene dichloride, are selective for lipoid substances including the fatty acid glycerides, sterols, phosphatides, oil-soluble vitamins and other fatty or oily substances that are present in the glands. They do not dissolve the enzymes such as trypsin, lipase or amylase. They do not denature or change the biologic value of the tissue proteins. Moreover, they inhibit autolytic activity. The fresh glands can be stored under the solvent at room temperature for several weeks without harming the character of the finished product. Furthermore, the solvent can be readily recovered from the fat and from the dry, defatted residue without leaving behind toxic by-products or materials of objectionable flavor or odor.

Other types of solvents which are useful in this process but not necessarily exactly equivalent to the halogenated hydrocarbons, include low boiling aliphatic and aromatic hydrocarbons and fractions of petroleum which form azeotropes boiling within the operating range. These include benzene, hexane, pentane, toluene, cyclopentane, cyclohexane, amylene and others.

It is advantageous to employ mixtures of substances forming azeotropes under some conditions. For example, in order to stop further action of enzymes on the tissue, it may be desirable to mince the tissue and mix it with a chlorinated hydrocarbon solvent such as ethylene dichloride, perchlorethylene, trichlorethylene or the like, and to carry on the subsequent distillation in the presence of another solvent capable of forming an azeotrope with water, such as benzene.

The azeotropes used herein are defined as a mixture of compounds which are immiscible. Thus, a mixture of the original compounds is more volatile than either of the pure compounds alone. In the present instance, the solvents should be substantially completely immiscible with water and should form an azeotrope with water, which boils at a temperature below about 60° C. under the pressure employed in the distillation.

The pressure under which the operation is carried out may vary considerably depending upon the operating temperatures, which in turn depend upon the solvent employed. Under optimum conditions a pressure of less than 250 mm. of mercury, and preferably in the range of about 50-300 mm., is employed. Thus, for example, when defatting or dehydrating a glandular substance such as liver or pancreas, a pressure of about 50-250 mm. of mercury is used, the temperature employed being about 30 to 50° C. Under these conditions water is distilled as an azeotrope of the solvent. The fat contained in the substance is dissolved in the solvent and can be withdrawn.

As a rule, the operation is carried out by adding comminuted glandular material to a distillation kettle. The system is evacuated to the desired operating pressure, for example, approximately 100–250 mm. of mercury, and is gradually heated until distillation begins.

It is important that an excess of solvent over that required to completely remove the water by azeotropic distillation be present in the vessel at all times. This can be accomplished either by adding the requisite amount of solvent at the time the distillation is begun, or by continually recycling or adding solvent to make up for that which is removed during distillation. The excess of solvent is required in part to dissolve the fat that may be contained in the tissue, and likewise in part to be certain that sufficient of the azeotrope-former is present so that there will always be more than enough to form the minimum boiling mixture of solvent with water in the vessel.

Generally, when all but approximately 1 to 5% of the water has been removed from the glandular material, the treatment is considered to be satisfactorily completed and the mixture in the kettle may be cooled. The glandular material is immersed in the solvent which also contains dissolved fat and fat-soluble substances. As the mixture is withdrawn from the kettle it may be filtered to remove as much oil and solvent as possible. The dry residue may then be washed or rinsed with fresh solvent to recover as much of the fat therefrom as possible.

In many instances the fat or oil thus produced has a high concentration of oil-soluble vitamins, oil-soluble hormones, phosphatides and other substances which may have specific pharmaceutical, therapeutic, food or industrial value.

Finally, the dehydrated, defatted residue is treated to remove the solvent. This may be done by vacuum distillation to recover all or substantially all of the solvent therefrom. It should be borne in mind that the temperature of the solvent must not be permitted to exceed approximately 50 to 60° C., and the treatment should be of as short duration as possible to avoid destructive effects upon the enzymes contained in the powder.

The dry powder is then separated and may be used as such or may be extracted according to known procedures with aqueous solutions, with alcohol (dilute), with acetone (dilute) or with glycerin solutions to remove enzymes from the solid protein. The enzymes extracted may then be treated according to known procedures to recover concentrates of enzymes.

Because of the high enzymatic activity of the powder, the material has many uses without further treatment. As previously stated, the proteolytic enzyme activity, the amylase activity and the lipase activity of those substances which are rich in these enzymes, are all several times that which is required of present day concentrates; hence, except in the preparation of pure substances, it is not necessary to further treat the dry, defatted substance unless, of course, it is desired to prepare a more highly purified enzymatic substance. Gland substances treated according to this process are excellent starting materials for the production of pure enzymes and for the study of these enzymes.

It has been found, for example, in the treatment of hog pancreas to produce trypsin, that the total trypsin content of the powder desiccated according to this process represents all of the trypsin present in the original material, plus an amount equal to the trypsinogen originally present. The minced pancreas is allowed to stand for a matter of several hours to two or three days before treating by azeotropic distillation, the conversion to the active form taking place during this time. Other enzymes may be similarly activated. The time employed is just enough to reach maximum activity of the sought-after enzyme. In view of the fact that the drying-defatting step may require from approximately 5 minutes to 4 hours, and is usually about 30 minutes to 2 hours in duration, and that water is being removed rapidly, further autolysis of the tissue is stopped before loss of enzymes occurs. The present process results in substantially complete recovery of the enzymes in the tissue treated, which is not the case according to conventional methods.

In the case of certain enzymes, particularly those having proteolytic activity, such as the tryptic enzymes, it has been observed that some conversion of the inactive form of the enzymes to the active form occurs during processing. Thus, for example, without preliminary activation or autolysis, frozen pancreas, macerated and immediately processed, will yield a product containing 30% to 50% of its potential trypsin in the active form. This is comparable to from 2 to 3 times USP strength pancreatin.

It should be noted that in conducting the autolysis step the preferred temperature is in the range of about 20 to 40° C. If autolysis is carried out above about 45° C. there is a loss in the enzyme values which are recoverable. The maximum limit of temperature for autolysis will vary depending upon the material undergoing treatment and the time employed. In some cases, temperature as high as 50° C. can be employed. Within the permissible limits the effect of enzyme activation is a function of time and temperature, conversion rates being lower at the lower temperatures.

The dried powders produced by the present process have greater stability and more uniform potency than those produced by other processes. In view of the fact that the temperature and operating conditions can be carefully controlled in the present process, there is less likelihood of variation in the potency of the finished powder, this depending primarily upon the amount of the desired enzyme in the starting material.

For many purposes, in the event powders of lower activity are desired, the powders produced by the present method can be diluted to any desired strength with suitable adulterants permitted by U. S. Pharmacopoeia such as salt or lactose, these being inert.

The tissue and glandular materials includes the tissues and glands of any animals, such as hogs, horses, cattle, sheep, poultry, etc., particularly those which are slaughtered in connection with the meat packing industry. The glands may include pancreas, liver, kidney, heart, adrenals, mucosa of the digestive tract, thyroid, spleen, thymus, etc. Blood may also be dehydrated according to this method.

It is one of the major advantages of this process that it makes available for use many substances which have been heretofore considered commercially unusable. For example, the pancreas of hogs are usually used as a source of pancreatin while those of sheep and certain other animals are not so used because of low activity. In my process, where deterioration and degradation of the enzymes is largely prevented and the recovery so much higher, it is possible to use glands of relatively low enzymatic activity. By the method of this invention these waste products are upgraded from a material of sub-marginal value to a material the value of which is measured by the active enzyme content of the dried powder.

As an illustration of the great importance of this invention, raw pancreas is in short supply because it is the source material for both the manufacture of insulin and the manufacture of pancreatin, an enzyme concentrate to make protein hydrolysates, for the bating of leather, etc. Both insulin and enzymes cannot be extracted from the same pancreas. As a consequence of the great demand for pancreas, the supply of raw material is insufficient to meet the demands for both insulin and enzyme production.

The present invention makes available for enzyme production pancreas which are now used in the production of tankage and considered a waste product. The pancreas powder produced by this invention is more active and more effective than the concentrates now produced, and, furthermore, the total yield, based upon the raw pancreas processed, is higher than can be produced by present conventional methods. Moreover, it makes possible the production of materials, for example, containing high tryptic enzyme content, from such waste products as fish intestines, these being particularly effective for the production of enzyme powder for leather bating. It is therefore evident that the use of this process makes available for insulin production large quantities of pancreas which is now being converted to pancreatin.

As a further illustration, in view of the fact that the yield and activity of pancreas powder containing enzymes is increased by the present process, it is evident that the same amount of enzyme-active material, based on units of enzymes, can be produced by this process from much less raw pancreas, thereby freeing an additional 25% or more of pancreas for insulin production without in any way decreasing the amount of pancreas powder available for production of enzymes. These are given merely as illustrations of the commercial significance and the advance in the art which this invention has made possible.

The following examples are given to illustrate the process but are not intended to limit it to the exact materials or conditions shown:

*Example 1.*—Pancreas from a freshly killed animal was minced and autolyzed for 24 hours at 30° C. It was then mixed with approximately ten times its volume of ethylene dichloride. At a temperature of 40° C., and a pressure of approximately 215 mm. of mercury, an azeotrope of solvent and water was distilled and this distillation was continued until about 98% of the water contained in the original gland had been removed. At no time was the temperature allowed to exceed approximately 50° C. When the material had been dehydrated to the desired point, the solvent was drained out through a screened opening in the vessel and fresh solvent was added to the dry residue. The mixture was stirred and finally the solvent was withdrawn to the full extent that it would drain out. The pressure within the kettle was then reduced to about 50–100 mm. and the vessel warmed, but never to a point above 50° C., until all of the ethylene dichloride was removed from the dried glands. The dry, defatted granular residue was then separated and ground to a uniform mesh. The activity of trypsin was assayed by determining the weight of casein rendered non-precipitable by acid-alcohol after incubation for one hour at 40°. Several preparations of this kind were prepared. One of these was six times as active as the USP pancreatin powder (a concentrate) which is commercially marketed.

The sample was also tested according to the method of Anson, J. Gen. Physiol., 22, 79 (1938). This showed an activity for the pancreas powder of this batch of one unit per gram of powder, using hemoglobin as a substrate.

In several representative runs, fresh hog pancreas was treated with enterokinase which converts trypsinogen to trypsin and the total trypsin measured. Its value was found to be from about 0.14 to 0.17 hemoglobin unit per gram which, calculated on a dried and defatted basis, was 0.83 to 1.09 units per gram. Powders produced by the present process from these hog pancreas contained an average of about 0.9 unit of trypsin per gram. The entire powder could be used as such or could be diluted with inert material to produce trypsin-containing powders of varying predetermined strength. These powders are stable upon standing.

Amylase activity was tested by hydrolyzing potato starch past the erythro-dextrine stage, the standard time being five minute at 40° C. USP pancreatin is required to hydrolyze twenty-five times its weight of soluble starch in five minutes at 40° C. According to one sample treated by this present invention, the activity was four times that of the USP standard. In another case, amylase split over two hundred times its own weight of starch in five minutes at 40° C., this being eight times the strength for USP amylase.

The lipase was also tested according to the standards of the British Pharmacopoeia and was found to be forty times as active as standard requirements for pancreatin. Lipase activity was also measured by the method of Balls, Matlack and Tucker, J. Biol. Chem., 122, page 125 (1937). In this method, 10.0 mg. of the powder was heated at 40° C. with benzyl butyrate emulsified in glycerol-bile. 17% of 0.214 g. of benzyl butyrate was hydrolyzed in ten minutes, or 33.5% in twenty minutes, which signifies a lipase activity of 2.1 units per gram of pancreas powder. Other enzymes found to be present in this powder were carboxypeptidase, ribonuclease, desoxyribonuclease, guanase, guanosinease, cholesterol, esterase and lecithinase.

In addition to the enzymes contained in this preparation, other therapeutic factors and vitamins are present and unharmed.

*Example 2.*—Intestinal mucosa may be separated from the intestines and may be treated in the manner described in Example 1, using ethylene dichloride or propylene dichloride as the solvent. The dried powder recovered from the process is found to contain high percentages of hormones including secretin, pancreozymin, enterogastrone, enterocrinin and cholecystokinin. Enzymes present in high concentration include erepsin, aminopolypeptidase, leucylpeptidase, prolinase, carboxypeptidase, enterokinase, histaminase and others. This material also contains a vasodilator factor of unknown composition, an anti-ulcer factor and the instrinsic factor of the anti-pernicious anemia substance which has substantial clinical value in the treatment of various diseases and is of high utility in replacement therapy for human use. The powder can be used as a supplement in protein hydrolysis. The enzyme enterokinase converts trypsinogen to trypsin while the peptidases break the protein down further than any other enzyme tested. It can also be used as an activator for pancreas preparations containing trypsinogen.

This dried, defatted gland substance, as well as that obtained from the pancreas, is a dry, stable, palatable powder which has no odor and a very mild, bland flavor. It contains no toxic substances, this having been proved by tests upon rats and rabbits.

*Example 3.*—Stomach lining, also known as gastric mucosa, is treated in the manner described in Example 1 for the pancreas. The dry, solvent-free powder contained, among others, the enzymes pepsin, rennin and lipase. It was tested for its pepsin content and was the strength required for USP pepsin. It should be borne in mind that commercial pepsin is a concentrate while this material was the dehydrated, defatted unconcentrated gastric mucosa. The dried, defatted material was found to contain the intrinsic factor useful in treatment of pernicious anemia. This material can also be used for hydrolyzing proteins in the manner described for the pancreas and for the intestinal mucosa. One of the great advantages of this type of treatment is the preparation of a dried, defatted stomach lining so that the fat has been removed and that the slimy substance contained in the lining, which makes processing so difficult according to the usual methods, is removed. The dry powder produced according to this method can then be extracted with water, dilute alcohol or with dilute glycerine, and concentrated extracts can be made quickly and readily by the use of ordinary equipment and the consumption of only a short time. Extraction with water and filtration can be carried out in a matter of a few minutes as compared with hours or days according to previous methods.

*Example 4.*—Kidneys may be treated according to the process outlined in Example 1. This can be done either using the entire kidney, in which case the whole kidney is macerated, or by treating the cortex and the medulla separately. The cortex and the medulla are separated by cutting the kidney at the proper point by conventional methods. When treating the whole kidney or the cortex to obtain renin, the pressor factor, and the anti-pressor factor as well as the enzymes contained in the kidneys, the temperature must be kept below 46° C. At 40° C. a product, which was active insofar as the above mentioned factors are concerned, was obtained. At 46° C. under the conditions of the experiment the treated powder was only 60% as active as the material produced at 40° C.

The medulla, which comprises about 15% of the whole kidney, may also be treated and produces a dry powder which is a source of varied enzymes.

Both medulla and cortex powders are a rich source of the enzyme Bc conjugase which converts folic acid conjugate to folic acid.

*Example 5.*—The spleen may be treated in a manner described in Example 1 to produce various enzymes. Using boiling ethylene dichloride, propylene dichloride or trichlorethylene at atmospheric pressure, the enzymes were destroyed but a material of high activity was obtained by treatment at a temperature below 45° C., the pressure being reduced within the distillation system until this temperature was attained.

*Example 6.*—When treating heart according to the method described in Example 1, not only was a dried powder containing enzymes obtained, but the dried powder contained a high concentration of cytochrome C. This powder produced by this process is used as a source for cytochrome C. by extracting with buffered aqueous solutions or with dilute trichloracetic acid solution. In one experiment, 100 mg. of highly purified cytochrome C. were isolated from 100 grams of powdered horse heart. The identity of cytochrome C. was established by examination in the spectrophotometer at appropriate wave lengths by the method of Umbreit, Burris and Staufer, "Manometric Techniques," p. 191 (1946) and by the increase in respiration that was obtained by adding it to a liver suspension using succinic acid as a substrate.

*Example 7.*—Thymus may be treated according to this process to produce a product presumably containing valuable heat-labile substances.

*Example 8.*—Liver may be treated according to this process to produce a product rich in many enzymes as well as being a potent source of the water-soluble vitamins, the anti-pernicious anemia factor, and other unknown substances necessary for optimum nutrition. When processed with ethylene dichloride at atmospheric pressure, the enzymes are destroyed even though the vitamins and some of the nutritional substances are fully present. When liver is dehydrated and defatted at 40 to 45° by reducing pressure, the resulting powder is a rich source of the following enzymes: Arginase, cathepsin, catalase, phosphorylase, hippuricase, lecithinase, esterase, phosphatase, ribonuclease, desaminase, beta-glycuronidase, and many others.

*Example 9.*—Tuna fish viscera was minced, desiccated and defatted according to the method of this invention, processed at low temperatures, and found to contain 1 USP trypsin and 1/6 USP amylase.

The enzymes can be extracted from the dry powder produced according to the foregoing and the residue again dried either by the present process or conventional methods. The powder thus produced is a rich source of protein and can be used for this purpose.

The dry powders, in addition to being a source of concentrated enzymes and other factors, can be used commercially for hydrolyzing various substances and specific substrates, either separately or in combination, as in tissues. For example, protein hydrolysates, which are used in certain special diets, can be prepared using the enzymes or the powders prepared from pancreas according to this invention. Starches may be hydrolyzed; fatty acids may be prepared; the powders can be used, for example, in treating leather, that is, for bating it to free the leather of certain undesirable fats and tissues and to prepare it properly for tanning. As a pharmaceutical the powders can be used as such in replacement therapy. Thus, more desirable whole pancreas powder can be used in place of pancreatin extract. Other powders described can be used to supply deficiencies of the particular enzymes or other substances in which the individual powders happen to be rich. Likewise, as previously mentioned, the powders can be used as a source material for producing individual enzymes.

It is likewise possible to extract enzymes or other substances from powders produced by this process, using water solutions or aqueous solutions of alcohol or acetone, and then to dry the extracts thus obtained by conducting an azeotropic distillation in the manner outlined above using temperatures below 60° C. In this way, dry, powdered extracts of even greater activity than can possibly be produced under conventional methods are produceable by means of this invention.

The invention of this application differs from co-pending application Serial No. 638,446, filed December 29, 1945, of Worsham and Levin in that the simultaneous drying and defatting of this invention is carried out without precoagulation of the tissue substance and at a temperature below that at which heat coagulation of protein in the tissue substance occurs.

I claim as my invention:

1. A process for simultaneously desiccating and defatting enzymatic substance derived from raw tissue and containing moisture and fat to produce a dried, defatted, solid substance, which comprises mixing said substance with a water immiscible fat solvent, said solvent being capable of forming an azeotrope with water boiling at a temperature below about 60° C., distilling the azeotrope from the suspended substance at a temperature below about 60° C. and below which enzymes are destroyed by heat, to remove a major part of the water contained therein, maintaining at all times sufficient liquid solvent in contact with said substance to dissolve the fat contained therein and to maintain the solid particles in suspension, then separating the liquid solution of fat and solvent from the dried solid thus formed and finally evaporating the residual solvent from the solid material at a temperature below about 70° C.

2. The process of claim 1 wherein the enzymatic substance is of animal origin.

3. The process of claim 1 wherein the enzymatic substance is mucosa from the digestive system of animals.

4. A process which comprises activating an enzyme-containing raw animal tissue to increase the enzyme activity thereof, said raw tissue containing moisture and fat, mixing the activated tissue with a water immiscible fat solvent capable of forming an azeotrope with water boiling at a temperature below about 60° C. at the operating pressure employed, simultaneously desiccating and defatting said activated tissue by distilling the azeotrope from the activated tissue at a temperature below 60° C. and below which enzymes are destroyed by heat, to remove a major portion of the water contained therein, maintaining at all times sufficient liquid solvent in contact with said activated tissue to dissolve the fat contained therein and to maintain solid particles of the activated tissue in suspension, then separating the liquid solution of fat and solvent from the dried solid thus formed and finally evaporating the residual solvent from the solid material at a temperature below about 70° C.

5. The process of claim 4 wherein the enzymatic substance is thyroid.

6. A process for simultaneously desiccating and defatting enzymatic substance derived from raw tissue and containing moisture and fat, which comprises suspending said substance in comminuted form in a water-immiscible fat solvent, said solvent being capable of forming an azeotrope with water boiling at a temperature between about 30° C. to about 60° C., distilling the azeotrope from the suspended substance at a temperature below 60° C. to remove a major part of the water contained therein, maintaining sufficient liquid solvent in contact with said tissue to dissolve the fat contained therein, then separating the liquid solution of fat and solvent from the dried solid thus formed and finally evaporating the residual solvent from the solid material at a temperature below about 70° C.

7. The process of claim 6 wherein the distillation is carried out at a pressure below about 500 mm. and a temperature in the range of about 30–60° C.

8. The process of claim 6 wherein the substance comprises comminuted raw fresh glands.

9. The process of claim 6 wherein the substance is comminuted pancreas.

10. The process of claim 9 wherein the substance is pancreas which has been autolyzed to increase the tryspin content.

11. The process of claim 6 wherein the solvent comprises ethylene dichloride.

12. The process of claim 6 wherein the solvent comprises propylene dichloride.

13. The process of claim 6 wherein the glandular substance is liver.

14. The process of claim 6 wherein the solvent comprises a chlorinated hydrocarbon boiling below about 120° C.

15. The process of claim 6 wherein the glandular substance is duodenum.

16. The process of claim 6 wherein the enzymatic substance is of animal origin.

17. A process for simultaneously desiccating and defatting uncooked animal tissue which comprises mincing said tissue suspending it in a liquid organic fat solvent immiscible with water, the amount of said solvent being in excess of that required to dissolve the fat from said tissue, said solvent being capable of forming an azeotrope with water boiling at a temperature below 60° C. under processing conditions, removing the water by azeotropic distillation of said solvent while maintaining a temperature below 60° C., thereafter draining the solvent containing dissolved fat from the desiccated, defatted tissue and removing the absorbed solvent by evaporation at a temperature below about 70° C.

EZRA LEVIN.

REFERENCES CITED

The following references are of record in the file of this patent:

UNITED STATES PATENTS

| Number | Name | Date |
|---|---|---|
| 1,267,611 | Wells | May 28, 1918 |
| 1,866,633 | Ehrenreich | July 12, 1932 |
| 1,934,677 | Ash | Nov. 14, 1933 |
| 2,028,800 | Orthmer | Jan. 28, 1936 |
| 2,145,796 | Keil et al. | Jan. 31, 1939 |
| 2,417,355 | Dummett et al. | Mar. 11, 1947 |